(12) United States Patent
Rodrigues

(10) Patent No.: US 9,498,037 B2
(45) Date of Patent: Nov. 22, 2016

(54) KEY HOLDER

(75) Inventor: Phillip Anthony Rodrigues, West Pennant Hills (AU)

(73) Assignee: KEYPA PTY LTD., West Pennant Hills (AU)

(*) Notice: Subject to any disclaimer, the term of this patent is extended or adjusted under 35 U.S.C. 154(b) by 0 days.

(21) Appl. No.: 14/361,330

(22) PCT Filed: Jul. 5, 2012

(86) PCT No.: PCT/AU2012/000809
§ 371 (c)(1),
(2), (4) Date: May 29, 2014

(87) PCT Pub. No.: WO2013/003907
PCT Pub. Date: Jan. 10, 2013

(65) Prior Publication Data
US 2014/0374281 A1    Dec. 25, 2014

(30) Foreign Application Priority Data

Jul. 5, 2011    (AU) ................................ 2011902678
Nov. 29, 2011    (AU) ................................ 2011253731

(51) Int. Cl.
*A45C 11/32*    (2006.01)
*A45C 15/06*    (2006.01)
(Continued)

(52) U.S. Cl.
CPC ............ *A45C 11/321* (2013.01); *A45C 11/324* (2013.01); *A45C 15/06* (2013.01); *B23P 19/00* (2013.01);
(Continued)

(58) Field of Classification Search
CPC ................. A45C 11/321; A45C 11/323; A45C 11/324; A45C 11/328; A45C 11/325–11/329; G09F 7/02–7/10; G09F 7/18; G09F 23/00–23/16; G09F 2023/0008–2023/005; G09F 3/08–3/208; A45F 2200/0558
(Continued)

(56) References Cited

U.S. PATENT DOCUMENTS 2,371,308 A    3/1945    Mosch
2,611,260 A    9/1952    Pontin
(Continued)

FOREIGN PATENT DOCUMENTS

CN    2440241 Y    7/2001
EP    1952717    8/2008
(Continued)

*Primary Examiner* — Anthony Stashick
*Assistant Examiner* — Mollie Llewellyn
(74) *Attorney, Agent, or Firm* — Mark M. Friedman

(57) ABSTRACT

A customizable key holder for retention of at least one key; the key holder comprising two separate outer sheathing plates which store the at least one key between them; one or more removable locking pins utilizing a locking mechanism to secure the at least one key between the outer sheathing plates; the key holder further including one or two interchangeable sheathing plate covers adapted for personalization of the key holder; at least one of the interchangeable sheathing plate covers providing storage space for an accessory element.

7 Claims, 5 Drawing Sheets

(51) Int. Cl.
*B23P 19/00* (2006.01)
*B26B 11/00* (2006.01)
*A45C 11/00* (2006.01)
*A45F 3/48* (2006.01)

(52) U.S. Cl.
CPC ............ *A45C 2011/001* (2013.01); *A45F 3/48* (2013.01); *A45F 2200/0558* (2013.01); *B26B 11/008* (2013.01); *Y10T 29/49826* (2015.01)

(58) Field of Classification Search
USPC ......... 220/23.86, 4.25, 4.24, 23.4, 524, 527, 220/694; 24/3.6
See application file for complete search history.

(56) References Cited

U.S. PATENT DOCUMENTS

| | | | |
|---|---|---|---|
| 7,373,681 B2* | 5/2008 | Elsener | ............... B25F 1/04 7/118 |
| 2004/0089560 A1 | 5/2004 | Sueda | |
| 2007/0033974 A1* | 2/2007 | Calavenna | ........... A44B 15/005 70/456 R |

FOREIGN PATENT DOCUMENTS

| | | | |
|---|---|---|---|
| MY | 122221 A | * | 3/2006 |
| WO | 2008070073 A2 | | 6/2008 |

* cited by examiner

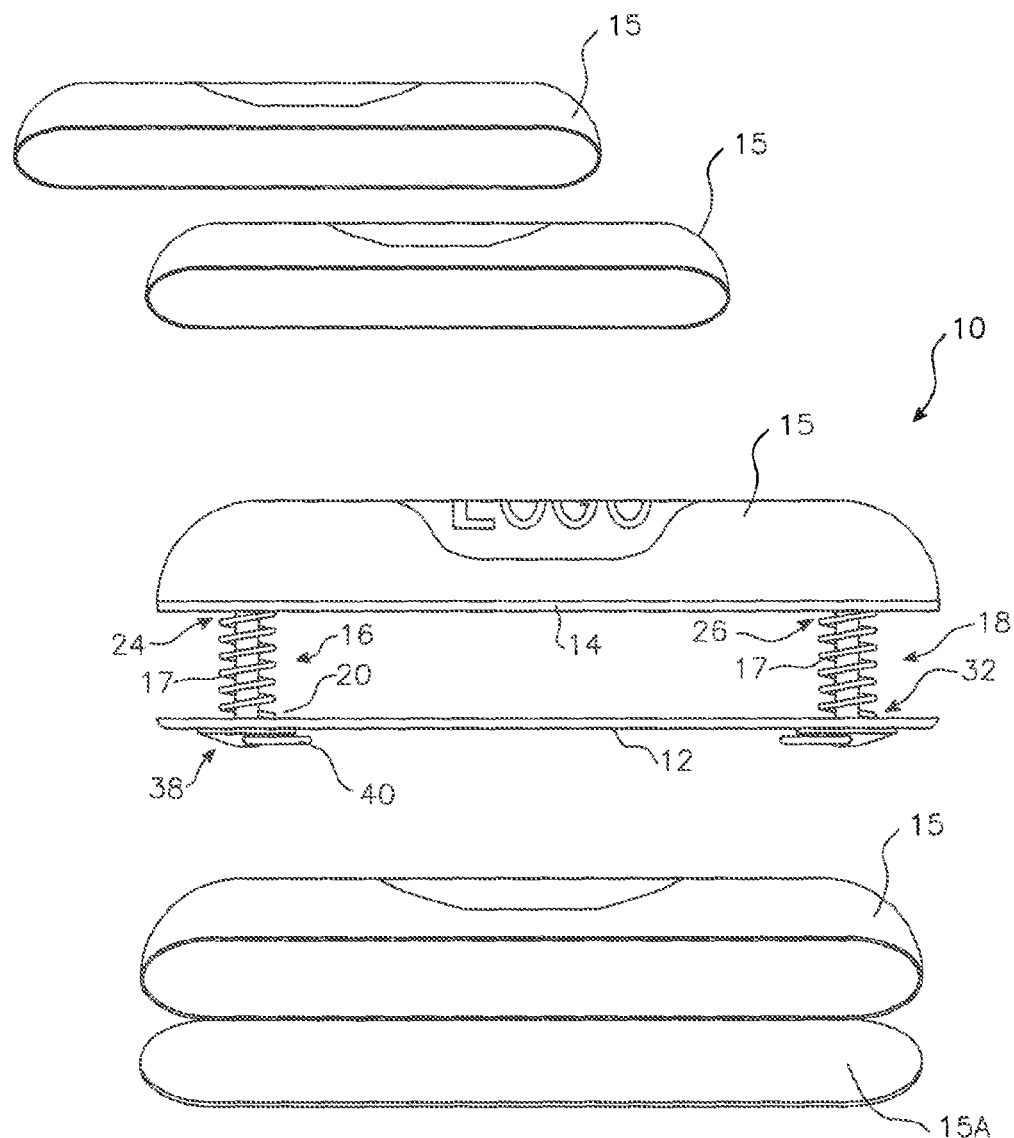
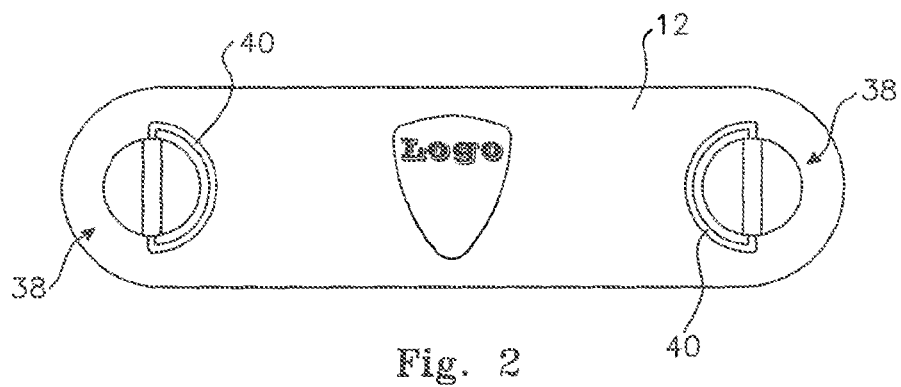

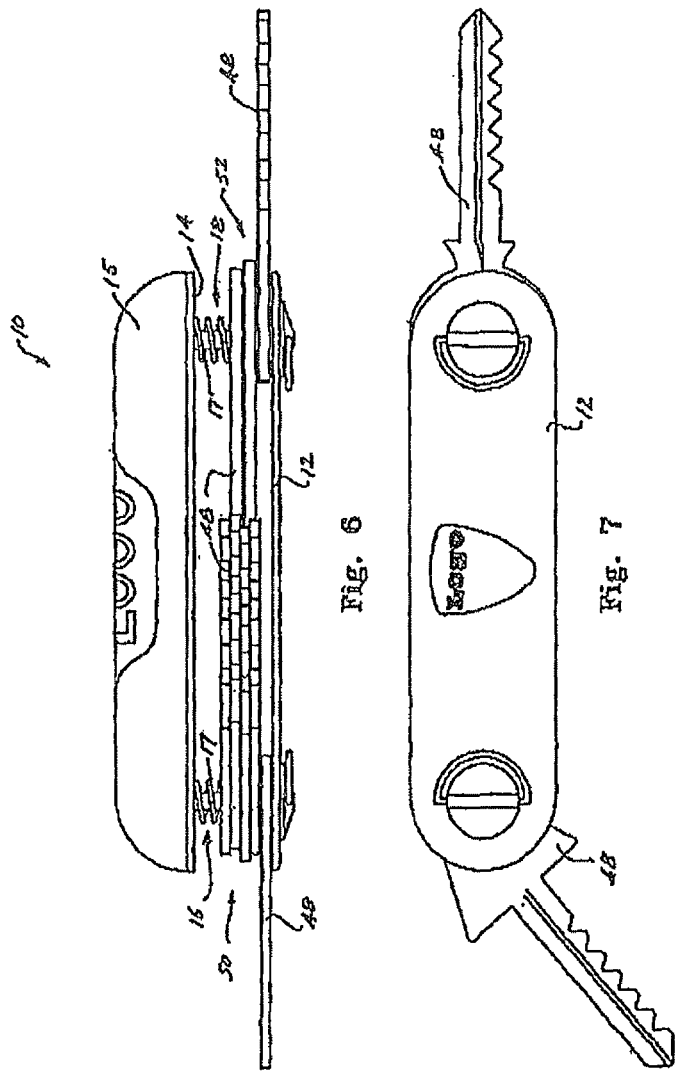

KEY HOLDER

TECHNICAL WIELD

The present invention relates to personal convenience devices and, more particularly, to key and small personal item management systems.

BACKGROUND

Probably from the time of the invention of the lock and key, the use of key rings has been the standard and most accepted simple method of storage and securing of multiple individual keys.

Alternative ways of managing the ungainly and pocket-damaging array of keys provided by the simple key sing by some form of containment sheathing are known. An example of a key sheathing arrangement was disclosed for example in an early patent, U.S. Pat. No. 1,793,594 by Dodson. At least one disadvantage of the Dodson arrangement and other attempts is the awkward means of attaching and detaching keys from the key holder. Such is the case for example in arrangements in which the keys are still attached to a key ring and drawn into a restraining flexible pouch.

Another disadvantage of known key holders is that they are limited to just the retention of one or more keys, so that typically small personal items remain unrestrained in the pocket of a user.

It is an object of the present invention to address or at least ameliorate some of the above disadvantages.

NOTES

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

A key-holder in accordance with one preferred form of the invention comprises of one or two outer sheathing plates which sheath the stored keys between them, one or more removable securing pins or bolts preferably utilising a turn locking mechanism which secures the stored keys, further preferably one or more small springs to provide resistance against loose keys and one or two removable sheath covers for personalisation, marketing, trademarks, key-set labeling and the like.

In one form, at least one of the sheathing plates which may be of plastic, metal or aluminium constructions incorporates an extruded form and has one or more holes located at each end, of which at least one hole at a minimum of one end may have a special form to allow integration and securing with one or two removable turn locking pins or bolts. This plate may be a flat extruded section, and may provide a platform for the storing of one or multiple keys in their most efficient form, while also providing the base platform for the attachment of a removable accessory cover and or accessory attachments.

In one preferred form, removable accessory covers of plastic, metal or aluminium construction provide the opportunity for user personalisation, marketing, trademarks, and the like on the outside visible face by way of their visual design, similar to mobile phone covers. These removable accessory covers also provide the potential to house internally within the cover, one or multiple functional devices or items, examples could be inclusive of but not limited to: a mirror, an LED torch, alarm transmitter, USB device, retractable lanyard etc.

The other sheathing plate of plastic, metal or aluminium construction, which itself can be a removable accessory cover, incorporates one or more holes located at each end, of which at least one hole at a minimum of one end has a diameter to allow the passing through of a turn locking pin or bolt. This sheathing plate also has the opportunity to itself incorporate user personalisation, marketing, trademarks, key-set labeling and the like on the outside visible face.

In a preferred form, a removable securing pin or bolt of plastic, metal or aluminium construction, utilises a turn locking mechanism and is of a diameter to allow it pass through the hole at the top of a key(s), and incorporates a form to enable it to lock into position with at least one sheathing plate. It may also incorporate a lift upturn assist handle that can be folded down in a flat position when not in use.

In a preferred form, the springs may be either round coiled compression springs or flat creased compression springing plates, and include a diameter to allow the passing through of a turn-able locking pin or bolt, and provide a resistance against the face of the closest aligned key as well as either a sheathing plate or removal securing pin or bolt head.

In one form, the removable accessory covers which may be of plastic, metal or aluminium construction can hide the form associated with integrating the removable locking pin(s) or bolt(s) with the main extruded sheathing plate. These covers may specifically offer the unprecedented opportunity and product surface area for user personalisation, marketing, trademarks, key-set labeling and the like on the outside visible face(s).

Accordingly, in a first broad for of the invention, there is provided a key holder for retention of at least one key; said key holder including at least one accessory compartment; said at least one accessory compartment formed by attachment of a selected one of a plurality of interchangeable covers to a structural element of said key holder.

Preferably, said key holder includes two said accessory compartments; each of said accessory compartments formed by selected said interchangeable covers attached to opposing structural elements of said key holder.

Preferably, said interchangeable covers comprise a generally elongate shell open at its underside; said shell being of generally arcuate section and rounded at its outer ends.

Preferably, said interchangeable covers comprise a generally elongated shell provided at an underside with a closure (15A) for retaining a stored item when said cover is removed from said structural element of said key holder.

Preferably, said at least one key is retained between said structural elements; said structural elements comprising a base sheathing plate and an opposite retainer sheathing plate; said base sheathing plate and said retainer sheathing plate interconnected by locking pins when assembled for use; each said locking pin operable between a first locked position and a second unlocked position; said at least one key threaded onto a shaft portion of a said locking pin.

Preferably, said base sheathing plate comprises a substantially flat elongate plate; said base sheathing plate provided with apertures proximate opposite ends of said base sheathing plate; respective said locking pins passing through said apertures when said key holder is assembled for use.

Preferably, said retainer sheathing plate comprises a substantially flat elongate plate; said retainer sheathing plate provided with corresponding apertures proximate opposite ends of said retainer sheathing plate; said corresponding apertures aligned with said apertures in said base sheathing plate; respective said locking pins passing through said apertures when said key holder is assembled for use.

Preferably, each of said apertures in said retainer sheathing plate includes engaging elements; said engaging elements engaging with complementary engaging elements of said locking pins when said key holder is assembled for use.

Preferably, an end of a shaft portion of each said locking pin distal from a head portion is provided with said complementary engaging elements.

Preferably, said head portion is of a larger diameter than said shaft portion; said head portion provided with a grasping element; said grasping element operable between an outwardly projecting position relative said head portion and a retracted position in which said grasping element lies against said base sheathing plate.

Preferably, spring means disposed between said base sheathing plate and said retaining sheathing plate limit free movement of said at least one key retained on said shaft portions of said locking pins; said spring means restraining said keys in their sheathed position.

Preferably, a removable accessory cover side of said retainer sheathing plate is provided with retaining structures along opposing edges of said retainer sheathing plate; said retaining structures accepting for attachment, complementary engagement structures of said removable accessory cover.

Preferably, said interchangeable cover provides a storage space for storage personal items or functional devices within a volume of space provided by said interchangeable cover.

Preferably, exterior surfaces of said interchangeable cover and said base sheathing plate provide for indicia and labelling.

Preferably, said removable accessory cover and said base sheathing plate are provided with a range of corporate indicia.

Preferably, said interchangeable cover and said base sheathing plate are provided in a range of colours, materials, finishes and textures.

Preferably, said locking pins are provided in a range of lengths to suit a desired key storage capacity.

Preferably, washers or discs are retained on said locking pins between said sheathing plates; said discs ox washers replaceable with keys.

Preferably, small accessory tools of similar size to keys may be threaded onto said locking pins and retained between said sheathing plates.

In another broad form of the invention, there is provided a method of customizing a key holder; said method including the steps of:
(a) providing at least one surface inscribable with indicia,
(b) providing at least one structural element configured for attachment of interchangeable covers.

Preferably, said interchangeable covers include a plurality of selectable covers; each said cover forming a storage space between an inside surface of said cover and a sheathing plate of said key holder.

In another broad form of the invention, there is provided a method of retaining at least one key in a key holder; said method including the steps of:
(a) operating a grasping element of at least one locking pin of said key holder to disengage said locking pin from an aperture in a retainer sheathing plate of said key holder,
(b) withdrawing said locking pin from said retainer sheathing plate,
(c) swinging or flexing a base plate of said key holder out of alignment with said retainer sheathing plate,
(d) passing a shaft portion of said locking pin through an aperture of said at least one key,
(e) re-aligning said base sheathing plate with said retainer plate,
(f) re-engaging said locking pin with said aperture in said retainer sheathing plate.

Accordingly in another broad form of the invention there is provided a customisable key holder for retention of at least one key; said key holder comprising two separate outer sheathing plates which store said at least one key between them; one or more removable locking pins utilising a locking mechanism to secure said at least one key between said outer sheathing plates; said key holder further including one or two interchangeable sheathing plate covers adapted for personalisation of said key holder; at least one of said interchangeable sheathing plate covers providing storage space for an accessory element.

Preferably, said interchangeable sheathing plate cover comprises a generally elongate shell.

Preferably, said shell is open at its underside.

Preferably, said interchangeable sheathing plate cover is formed as a generally elongate body of generally arcuate section and rounded at its outer ends so as to form a comfortable fit in the hand of a user when attached to a said sheathing plate for use.

Preferably, said storage space houses an electronic device.

Preferably, said storage space houses any one of a mirror, LED torch, alarm transmitter or USB device.

Preferably, said at least one of said interchangeable sheathing plate covers is provided at an underside with a closure for retaining a stored item when said at least one of said interchangeable sheathing plate covers is removed from one of said sheathing plates of said key holder.

Preferably, said two separate outer sheathing plates comprise a base sheathing plate and an opposite retainer sheathing plate; said base sheathing plate and said retainer sheathing plate interconnected by said locking pins when assembled for use; each said locking pin operable between a first locked position and a second unlocked position; said at least one key threaded onto a shaft portion of a said locking pin.

Preferably, said pins are removable from said outer sheathing plates without need of disassembly tools.

Preferably, an exterior surface of said interchangeable sheathing plate covers provides for indicia and labelling.

Preferably, an exterior surface of said at least one of said interchangeable sheathing plate covers includes a covering element comprising any one of a slip-on cover, an adhesive film or a sticker.

Preferably, said at least one of said interchangeable sheathing plate covers is provided in a range of colours, materials, finishes and textures.

Preferably, small accessory tools of similar size to keys may be threaded onto said locking pins and retained between said outer sheathing plates.

In yet a further broad form of the invention there is provided a method of customizing a key holder; said key holder comprising a pair of separate outer sheathing plates for retention therebetween of at least one key; said method including the steps of:
providing at least one interchangeable outer sheathing plate cover,
shaping said at least one interchangeable outer sheathing plate cover as a shell adapted for storage of an accessory element.

Preferably, said at least one interchangeable outer sheathing plate cover is inscribable with indicia.

Preferably, said method further includes the step of providing at least one of said pair of outer sheathing plates as a base platform configured for attachment of a said interchangeable outer sheathing plate cover; said interchangeable outer sheathing plate cover selected from a plurality of interchangeable sheathing plate covers.

Preferably, said pair of separate outer sheathing plates are interconnected in use by locking pins.

Preferably, a said interchangeable outer sheathing plate cover forms a storage space or housing space between an inside surface of said cover and one of said pair of separate an outer sheathing plates of said key holder.

BRIEF DESCRIPTION OF DRAWINGS

Embodiments of the present invention will now be described with reference to the accompanying drawings wherein:

FIG. 1 is a side view of a preferred embodiment of an assembled improved key holder according to the invention, FIG. 2 is a view of the underside of the key holder of FIG. 1.

DESCRIPTION OF EMBODIMENTS

Figure 3:
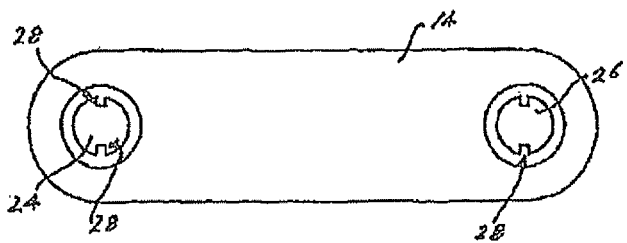
FIG. 3 is a view of a first side of a retaining sheathing plate of the key holder of FIGS. 1 and 2.

The key holder of one preferred form of the invention provides for the retention of at least one key in a partly enveloping casing. This casing is configured for ease of access to any key for use, and for the addition and removal of a key from the holder. Preferably, it is also of a shape that falls easily into the hand, has rounded edges, at least at the outer ends of a generally elongate body, and is free of sharp projections Additionally, the key holder may include surfaces suited to the display of inscribed or added indicia, such as for example company logos and advertising. Moreover, the structure of the key holder casing may be such that it provides at least one small accessory compartment for retention of small items. These could include for example, cosmetics, pocket knife, mirror, torch, alarm transmitters, an MP3 player, lighter or a USB memory stick.

An accessory compartment of the key holder of a preferred form of the invention is formed by the addition of an interchangeable cover which attaches to a primary structural element of the key holder. Covers are shaped so as to not only provide a storage space, but also to add to the aesthetic appeal of the key holder through simplicity of design.

Interchangeable covers may be provided in a range of colours and styles, and may carry indicia, for example logos and advertising as mentioned above, or personalised information. The inscribed or added indicia and the interchangeable covers of the key holder in preferred forms of the invention provide for customization and personalisation of the key holder.

Preferred Embodiments

With reference to FIG. 1, a key holder (10) according to a preferred embodiment of the invention, comprises two primary structural elements; a base sheathing plate (12) and an opposite retainer sheathing plate (14). An interchangeable accessory compartment cover (15) is releasably attached to at least the retainer sheathing plate (14). The base sheathing plate (12) and the retainer sheathing plate (14) are interconnected when assembled for use in a preferred arrangement, by two locking pins (16) and (18). It will be understood that the length of these pins may be selected according to the preferred degree of key storage.

The key holder of this embodiment may be provided with a number of discs or washers of a thickness similar to that of keys and sufficient in number to fill the space between the base and retainer sheathing plates. These discs can be replaced with keys as required.

The base sheathing plate (12) preferably comprises a substantially flat extruded elongate plate provided with apertures (20) and (22) proximate opposite ends of the base sheathing plate (12). Locking pins (16) and (18) may pass through these apertures when the key holder (10) is assembled for use. Each of locking pins (16) and (18) may be operable between a first locked position (as shown in FIGS. 1 and 2) and a second unlocked position.

Base sheathing plate (12) may be of a flexible material to allow ease of access to rotate stored keys into a position for use as shown in FIGS. 6 and 7. To accommodate this flexibility, apertures (20) and (22) may be in the form of slots.

The retainer sheathing plate (14) may also comprise a substantially flat elongate plate and is of substantially similar size to the size of the base sheathing plate (12). It also may be provided with corresponding apertures (24) and (26) proximate the opposite ends of the plate. These apertures align with the apertures (20) and (22) in the base sheathing plate (12) when the key holder (10) is assembled for use.

Figures 4, 4A:
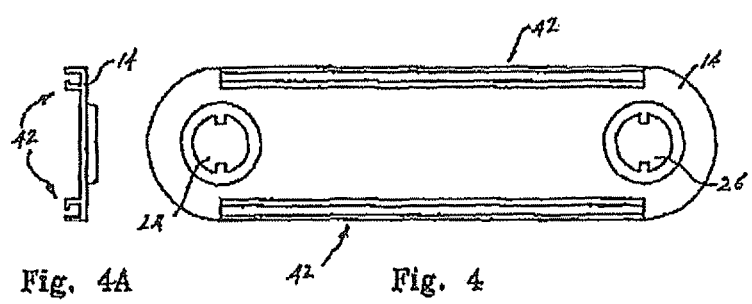
FIG. 4 is a view of a second side of the retaining sheathing plate of FIG. 3.
FIG. 4A is a sectioned end view of the retaining sheathing plate of FIGS. 3 and 4.
Figure 5:
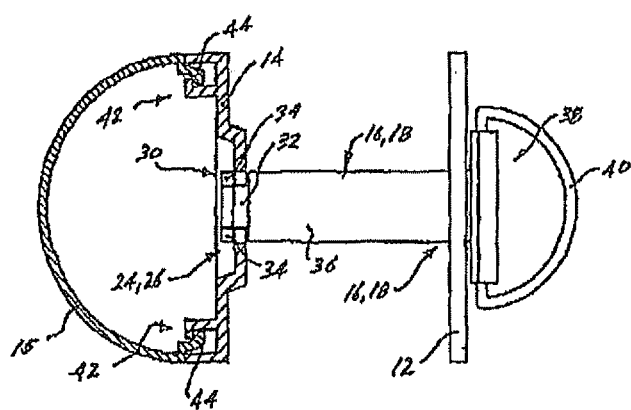
FIG. 5 is a part sectioned end view of the assembled key holder of FIG. 1, FIGS. 6 and 7 are a side view and a view of the underside of the key holder in use.

As can be seen from FIGS. 3, 4 and 5, the apertures (24) and (26) include locking elements, preferably diametrically opposed projecting elements (28), adapted to engage with complementary engaging elements (30) of the locking pins (16,18).

With particular reference to FIG. 5, each locking pin (16,18) comprises a shaft portion (36) and a head portion (38) which is of a larger diameter than the shaft portion. The diameter of the shaft portion (36) is chosen as being less than the typical diameters of those apertures provided in keys by which means keys may be threaded onto a key ring or suspended on a hook for example.

An end of the shaft portion (36), distal from the head portion (38), is provided with the abovementioned complementary engaging elements (30). In a preferred arrangement, the engaging elements (30) of the locking pins comprise an annular groove (32) with slots (34) between the annular groove and the outer end of the pins. These diametrically opposed slots (34) correspond to the projecting elements (28).

By this arrangement, a locking pin may be inserted into the apertures (24, 26) when the slots (34) are rotated into alignment with the projecting elements (28). Turning the pin through ninety degrees then captures the projecting elements

(28) in the groove (32), thereby securing the locking pins to the retaining sheathing plate (14).

Head portion (38) is provided with a grasping element (40) which is operable between an outwardly projecting position relative the head portion (38) as shown in FIG. 5, and a retracted position as shown in FIGS. 1 and 2. In this latter position the grasping element (40) lies against the surface of the base sheathing plate (12). Preferably, grasping element (40) is in the form of a semi-circular ring, pivotally attached to the head portion and provided with biasing means (not shown) towards the retracted position.

Preferably, the holder (10) is provided with spring means, disposed between the base sheathing plate (12) and the retaining sheathing plate (14), which urge any keys retained between the plates against the base sheathing plate (12) and act to retain the keys in their sheathed position. Preferably, as best seen in FIG. 6, the spring means are in the form of light coil compression springs (17) which locate around the locking pin shafts and serve to prevent both the rattling of keys (48) and restrict their rotation out of the holder when not required for use. Preferably, springs (17) are, captive in that they are attached at their base to the retaining sheathing plate (14).

With reference now to FIGS. 4, 4A and 5, the second, or opposite side of retainer sheathing plate (14) is provided with engagement structures in the form of lipped slots (42), along its opposing edges for attachment of the removable accessory compartment cover (15).

Preferably, removable accessory compartment cover (15) is of a semi-rigid material forming a shell open at its underside and provided along its lower opposing edges with complementary engagement structures (44) which may be clipped into or slid onto the lipped slots (42). Alternatively, the removable accessory compartment may include a sliding closure (not shown) at the base of the shell so as to retain an article in the compartment when this is released from the engagement structures (42).

Preferably the shell of removable accessory compartment cover (15) is generally arcuate in profile and rounded at its outer ends to form provide a comfortable grip in the hand. The shell provides a storage space between an inside surface of the removable accessory cover and the second or opposite side of the retainer sheathing plate (14).

Figure 8:
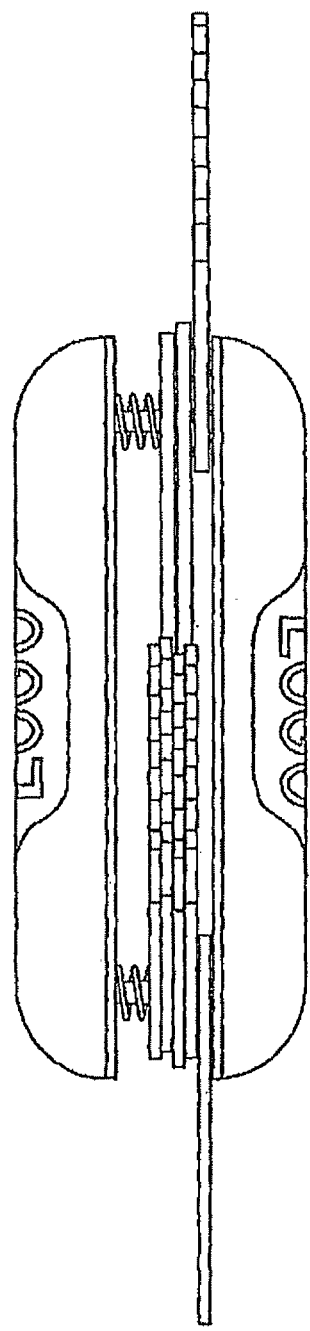
FIG. 8 is a side view of a further preferred embodiment of the invention.

In an alternative preferred embodiment shown in FIG. 8, the base sheathing and retainer sheathing plates are each provided on their outward facing surfaces with engagement structures such as shown in FIG. 5 adapted to releasably retain similar accessory covers so as to provide two accessory compartments.

Typically, the key holder of the invention will be provided with an initial, or default accessory compartment cover or covers. A default cover may or may not carry indicia. Participating retail outlets may provide a range of optional interchangeable covers which are compatible with the cover retaining elements of the key holder.

In another preferred arrangement, optional covers may be in the form of an elasticized flexible sheath, for example of fabric, which may be stretched over the initially provided default cover or covers.

In still another preferred embodiment, the optional cover may be a polymer film provided with a self adhesive surface protected prior to use by a peel-off protective layer.

As noted above, optional covers may be provided in a range of different colours and textures as well as carrying company logos, advertising or personalising indicia. Thus for example, a cover may be provided in the colours and the logo of a favoured sporting team, or with the image of a favoured celebrity figure.

Optional interchangeable covers may be provided not only for the accessory compartment of the key holder, but also for the outward facing side of the base sheathing plate for embodiments which only provide for a single compartment.

The key holder (10) of the invention may be made of any suitable material including metallic and polymer materials.

Although the above description has focused on the retention of keys between the sheathing plates of the key holder, it will be appreciated that other useful articles of similar size to a key may conveniently be stored in the holder. Thus for example small accessory tools such as scissors, nail file, penknife blade or a suspension hook, may be threaded onto the locking pins.

Figure 9:
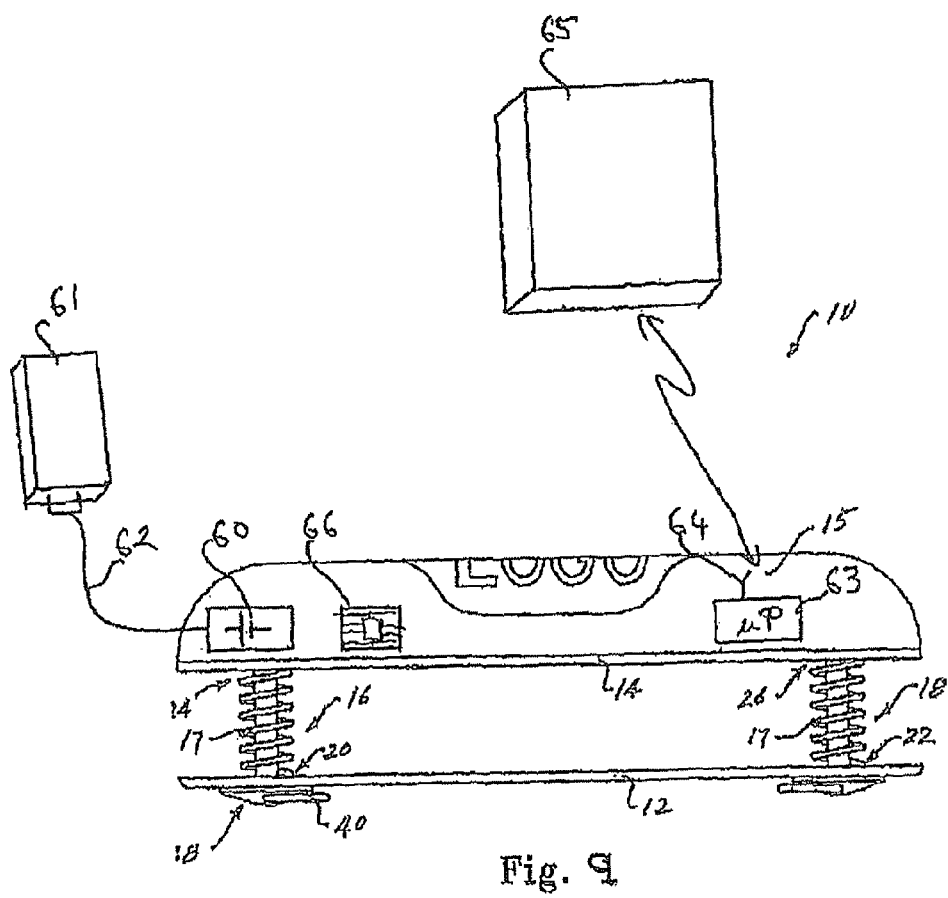
FIG. 9 is a side view of a further preferred embodiment incorporating electronic and microchip technology within a sheathing plate cover.

Further modifications and improvements can include the following:

The storage of electronic and microchip technology within the sheathing plate covers. With reference to FIG. 9, the technology can include a power supply/battery charger device (60) for charging external devices such as mobile phones (61) via cable (62). The technology may also include a microprocessor based device (63) in communication with a transmitter (64) for maintaining radio communication with a mobile phone (65) thereby to enhance or supplement the capabilities of the mobile phone. In one instance, at least some of the functionality of a smart phone can be incorporated within the microprocessor based device (63) thereby permitting the mobile phone (65) to be smaller for a given level of capability. In a further particular form the microprocessor based device (63) can include all the functionality of a mobile phone sufficient that the key holder can function as a mobile telephone. In a particular form this can include short range communication functionality as well such as "Bluetooth" or Near Field Communication (NFC) thereby to communicate with headsets, point of sale payment facilities and the like. The microprocessor based device (63) can further include GPS or similar location capability. This would allow the device to act for example as an emergency locator. The device (63) may also act to provide encoding capability as used to secure banking transactions. The shell (15) may also enclose a microchip device (66) encoded to facilitate secure banking transactions or secure door entry or the like. Other electronic devices can include a laser pointer, an audio speaker and a lost key locator. As earlier described, non-electronic devices that may be housed within the shell can additionally include cosmetics, a mirror, a pen and most other compact items for personal use.

By way of non-limiting example, items both electronic and non-electronic which may be housed within the shell may include:
  iPad/iPhone/iPod accessories
  Cisco Console cables/IT troubleshooting cables used for vendor specific devices
  Portable sewing kit
  Universal Plugin charger for mobile phones/iPads/spare battery compartment
  Miniaturized camera
  Universal remote control
  Micro tools
  Multi purpose cables (such as a USE cable that rolls up)
  Cosmetics
  Liquid compartment for cologne, hand sanitizer
  Pocket knife
  Tools—miniature stud finder, laser measurement device Mirror
Torch, flash light
Alarm transmitters
Key locator
MP3 player
Lighter
USB storage
Retractable lanyard
Retractable spring hook
Belt clip
RSA Security token
Random number generator used in two factor authentication with LED display
Floatation device/inflatable devices
Microchip ID technology such as chips for access doors, swipe card chips, identification chips to start cars, ID chips for access to gym clubs
Storage for medication, pills, mints
Storage for small personal items—money notes, cigarettes, tobacco
Miniaturized tools (screw driver)
Pen/high lighter/ruler
Tape measure
Spirit level
Watch/Alarm clock with calendar
Mobile device signal antennae (booster)
Laser pointer and presentation remote control
Bluetooth remote control for Bluetooth enabled devices
Mobile phone stand
Hi-Definition Bluetooth hands free speakerphone for mobile phones
Electronic display (LCD/LED) for photos
Mini radio transmitters/receivers
Book lights
Magnet attachment to stick to a fridge
Bottle opener
Cork Screw
Third party interfacing attachment capability (Eg Swiss Army knife attachment)
3G modem with SIM capability (as an alternative to the standard 3G/4G/LTE modem)
Toiletries
Tooth brush
Tampon holder
Personal distress alarm/panic device
Tracking device
Micro Portable speakers
Lint remover
Comb
Voice recorder
Compass
Electronic multi function device with interchangeable software (ie with an interface)—while most smart phones are able to do a function, you can't actually use the function while on the phone
Bluetooth speaker phone
Pedometer (similar to the idea of the Nike+iPod Accessory)
Retractable Magnifying glass
Prescription lenses
Micro Bluetooth touch pad (as a substitute for a mouse or track pad)

As earlier described, the sheathing plate (12) can comprise of a flexible material incorporating slotted holes for the passing through of the locking pins, so as to allow the retaining sheathing plate to flex outwardly and hence gain access to the stored keys.

INDUSTRIAL APPLICABILITY

The key holder (10) of embodiments of the invention provides convenient storage for a number of keys as shown in FIGS. 6 and 7. In a preferred embodiment described above and indicated in the drawings, the holder provides for two stacks of keys (50) and (52), threaded onto the respective locking pins (16) and (18).

To add a key to the holder, the locking pin, to which the key is to be added, is unlocked by turning the grasping element and withdrawing the outer portion of the locking pin from the retaining sheathing plate. The base sheathing plate can then be swung or flexed out of alignment with the retaining sheathing plate to access the released locking pin, and the key threaded onto the pin. The base sheathing plate (12) is then swung or flexed back into alignment and the locking pin re-secured to the retaining sheathing plate (14).

As noted above, the storage space provided by the removable cover portion (15) may be used to retain small personal items such as a mirror, an LED torch, alarm transmitter, USB device, retractable lanyard and coins for example.

The above describes only some embodiments of the present invention and modifications, obvious to those skilled in the art, can be made thereto without departing from the scope of the present invention.

The invention claimed is:

1. A customisable key holder for retention of at least one key; said key holder including:
   (i) two separate outer sheathing plates which store said at least one key between them;
   (ii) at least-one accessory compartment; said at least one accessory compartment including an interchangeable sheathing plate cover releasably attached to at least-one of said outer sheathing plates, wherein said interchangeable sheathing plate cover is formed as a shell and provides a storage space for an accessory element or stored item within the interchangeable sheathing plate cover, and wherein the storage space is defined between the inside surface of said cover and the sheathing plate to which said cover is attached; said interchangeable sheathing plate cover is adapted for personalisation of said key holder and selected from a plurality of interchangeable sheathing plate covers, and wherein said interchangeable sheathing plate cover comprises a generally elongate shell provided at an underside with a closure for retaining the accessory element or stored item when said cover is removed from said at least one of said outer sheathing plates of said key holder;
   (iii) one or more removable locking pins utilising a locking mechanism to secure said at east one key between said outer sheathing plates; and
   (iv) an electronic and microchip technology stored within the sheathing plate cover.

2. The key holder of claim 1, wherein said key holder includes two said accessory compartments; each of said accessory compartments formed by selected one of said interchangeable sheathing plate covers attached to one of said outer sheathing plates of said key holder.

3. The key holder of claim 1, wherein said interchangeable sheathing plate covers comprise a generally elongate shell open at its underside.

4. The key holder of claim 1, wherein exterior surfaces of said interchangeable sheathing plate covers and said outer sheathing plates are adapted to carry a covering element comprising any one of a slip-on cover, an adhesive film or a sticker that provides for indicia and labelling.

5. The key holder of claim 1, wherein said interchangeable sheathing plate covers and said outer sheathing plates are provided in a range of colours, materials, finishes and textures.

6. The key holder of claim 1, wherein the storage space for an accessory element or stored item is adapted to store an accessory element or item selected from one or more of the following:
 (a) iPad or iPhone or iPod accessories
 (b) Cisco Console cables or IT troubleshooting cables for vendor specific devices
 (c) Portable sewing kit
 (d) Universal Plugin charger for mobile phones or iPads or spare battery compartment
 (e) Miniaturized camera
 (f) Universal remote control
 (g) Micro tools
 (h) Multi purpose cables
 (i) Cosmetics
 (j) Liquid compartment for cologne or hand sanitizer
 (k) Pocket knife
 (l) Miniature stud finder or laser measurement device
 (m) Mirror
 (n) Torch or flash light
 (o) Alarm transmitters
 (p) Key locator
 (q) MP3 player
 (r) Lighter
 (s) USB storage
 (t) Retractable lanyard
 (u) Retractable spring hook
 (v) Belt clip
 (w) RSA Security token
 (x) Random number generator used in two factor authentication with LED display
 (y) Floatation or inflatable device
 (z) Chips for access doors, swipe card chips, identification chips to start cars, or ID chips for access to gym clubs
 (aa) Storage for medication, pills or mints
 (bb) Money notes, cigarettes or tobacco
 (cc) Miniaturized tools
 (dd) Pen or high lighter or ruler
 (ee) Tape measure
 (ff) Spirit level
 (gg) Watch/Alarm dock with calendar
 (hh) Mobile device signal antennae (booster)
 (ii) Laser pointer and presentation remote control
 (jj) Bluetooth remote control for Bluetooth enabled devices
 (kk) Mobile phone stand
 (ll) Hi-Definition Bluetooth hands free speakerphone for mobile phones
 (mm) Electronic display for photos
 (nn) Mini radio transmitters or receivers
 (oo) Book lights
 (pp) Magnet attachment to stick to a fridge
 (qq) Bottle opener
 (rr) Cork Screw
 (ss) Third party interfacing attachment capability
 (tt) 3G modem with SIM capability
 (uu) Toiletries
 (vv) Tooth brush
 (ww) Tampon holder
 (xx) Personal distress alarm or panic device
 (yy) Tracking device
 (zz) Micro Portable speakers
 (aaa) Lint remover
 (bbb) Comb
 (ccc) Voice recorder
 (ddd) Compass
 (eee) Electronic multi function device with interchangeable software
 (fff) Bluetooth speaker phone
 (ggg) Pedometer
 (hhh) Retractable Magnifying glass
 (iii) Prescription lenses
 (jjj) Micro Bluetooth touch pad
 (kkk) the storage of electronic and microchip technology within the sheathing plate covers
 (lll) Medical diagnostic device.

7. The key holder of claim 1, further including a microprocessor based device for performing on board computation thereby to add functionality.

* * * * *